United States Patent [19]

Jacobsen et al.

[11] Patent Number: 5,174,159
[45] Date of Patent: Dec. 29, 1992

[54] LINEAR DISPLACEMENT AND STRAIN MEASURING APPARATUS

[75] Inventors: Stephen C. Jacobsen; Clark C. Davis; Michael G. Mladejovsky, all of Salt Lake City, Utah

[73] Assignee: University of Utah Research Foundation, Salt Lake City, Utah

[21] Appl. No.: 722,487

[22] Filed: Jun. 21, 1991

[51] Int. Cl.[5] .............................................. G01B 7/16
[52] U.S. Cl. ........................................ 73/767; 73/777;
73/780; 307/580
[58] Field of Search .................. 73/763, 767, 774, 775,
73/777, 779, 780, 862.64; 357/25, 26; 307/580;
364/561

[56] References Cited

U.S. PATENT DOCUMENTS 4,811,254  3/1989  Iijima et al. ..................... 364/561
4,944,181  7/1990  Wnuk .............................. 73/780

Primary Examiner—Jerry W. Myracle
Attorney, Agent, or Firm—Thorpe North & Western

[57] ABSTRACT

Linear displacement and strain measuring apparatus includes a linearly movable element, an emitter disposed on the movable element to move as the element is moved, for developing predetermined paterns of electric fields which vary linearly on the emitter in the direction of movement of the element, and a detector disposed in close proximity to the emitter adjacent the path in which the emitter moves to detect variations in the electric field patterns as the emitter is moved, for producing output signals representing variation in the electric field patterns and thus the linear displacement of the movable element relative to the detector. By attaching the movable element and the detector to spaced apart locations on a specimen, strain in the specimen can be measured.

40 Claims, 5 Drawing Sheets

• PLOT FOR A GIVEN POSITION OF THE EMITTER
X PLOT FOR A DIFFERENT POSITION OF THE EMITTER

|    | D C B A |
|----|---------|
| 0  | 0 0 0 0 |
| 1  | 0 0 0 1 |
| 2  | 0 0 1 1 |
| 3  | 0 0 1 0 |
| 4  | 0 1 1 0 |
| 5  | 0 1 1 1 |
| 6  | 0 1 0 1 |
| 7  | 0 1 0 0 |
| 8  | 1 1 0 0 |
| 9  | 1 1 0 1 |
| 10 | 1 1 1 1 |
| 11 | 1 1 1 0 |
| 12 | 1 0 1 0 |
| 13 | 1 0 1 1 |
| 14 | 1 0 0 1 |
| 15 | 1 0 0 0 |
| 0  | 0 0 0 0 |

LINEAR DISPLACEMENT AND STRAIN MEASURING APPARATUS

BACKGROUND OF THE INVENTION

This invention relates in general to apparatus for sensing relative displacement, and in particular instances to apparatus for measuring strain in an object.

Measurement of strain (the change in length of an object in some direction per unit undistorted length) in specimens and objects may be carried out either directly or indirectly. Some of the approaches used for direct strain measurements include the use of bonded wire strain gauges (in which a grid of strain sensitive wire is cemented to a specimen so that a change in the length of the grid due to strains in that specimen changes the resistance of the wire which can then be measured), mechanical strain gauges (in which optical or mechanical lever systems are employed to multiply the strain which may then be read from a suitable scale), magnetic strain gauges (which include magnetic circuits having air gaps which, when varied as a result of a strain in the specimens, varies the permeance of the circuits to provide an indication of the strains produced), semiconductor strain gauges (in which the resistance of a piezoelectric material varies with applied stress and resulting strain in the material), capacitance strain gauges (in which a variation of capacitance caused by variation in the separation of elements due to strain in the specimen, can be measured to provide a reading of the strain), and field-based strain sensors (in which a flexible substrate includes an electric field-producing element and one or more electric field detecting elements for determining position of the detecting elements relative to the field-producing element to thereby provide a measure of relative movement and thus a reading of the strain in an object to which the substrate is attached). Other direct strain measuring devices include acoustic strain gauges, brittle lacquer coatings and photogrids.

Approaches for indirectly measuring strain in a specimen include the use of displacement pick-up devices, velocity pick-up devices, and acceleration detection devices.

A disadvantage of some of the conventional approaches to measuring strain is that the devices employed are oftentimes difficult to attach to or use with a specimen whose strain is to be measured. Also, such devices are typically difficult and costly to manufacture. Finally, because of the intrinsically high axial rigidity of many of such devices, it requires high quality bonding of the devices to the specimen to prevent detachment due to failure of the bond and this, in turn, requires time-consuming and careful preparation of the specimen for bonding.

The field-based strain sensor briefly mentioned above obviates and overcomes some of these problems and can be made very compactly and inexpensively (see U.S. Pat. No. 4,964,306). However, for some applications, even more precise, strain transducers would be required or at least desirable.

SUMMARY OF THE INVENTION

It is an object of the invention to provide an easy to fabricate, efficient and highly precise uniaxial strain transducer.

It is another object of the invention to provide such a transducer which has high resolution and a large dynamic range relative to the size of the transducer.

It is a further object of the invention to provide such a transducer in which relatively few wires and wire connections are required for constructing and operating the transducer.

It is also an object of the invention to provide such a transducer well suited for manufacture using very large scale integration (VLSI).

It still another object of the invention to provide such a transducer constructed to be generally insensitive to undesired mechanical and environmental effects.

The above and other objects of the invention are realized in one specific illustrative embodiment of a linear displacement and strain measuring device which includes a linearly moveable element whose linear displacement is to be measured, an emitter disposed on the moveable element to move as the element is moved, for developing predetermined patterns of electric fields which vary linearly on the emitter in the direction of movement of the element, and a detector disposed in close proximity to the emitter adjacent the path in which the emitter moves to detect variation in the electric field patterns as the emitter is moved, for producing output signals representing variations in the electric field patterns. Such variations provide an indication of the position and displacement of the emitter relative to the detector. By coupling a portion of the emitter to an object in which strain is to be measured, and a portion of the detector also to the object, any relative movement between the emitter and the detector constitutes an indication of strain occurring in the object.

In accordance with one aspect of the invention, the emitter comprises a generally planar emitter plate mounted on the linearly moveable element to move in the plane defined by the emitter plate and to direct the electric fields normally from an active side of the plate. The detector includes a generally planar detector plate disposed in a fixed position generally parallel with the emitter plate on the active side thereof to thereby detect variation in the electric field patterns as the emitter plate is moved.

In accordance with another aspect of the invention, the moveable element comprises an elongate tab which may be attached to the object in which strain is to be measured. The emitter plate is mounted on the tab and includes a plurality of emitter element sections formed in predetermined patterns on the active side of the plate to develop electric fields in response to electric input signals. The device further includes an electric signal generator for supplying electric input signals to the emitter element sections.

Finally, in accordance with still another aspect of the invention, a plurality of linear tracks are formed on the active side of the emitter plate, with each track including a plurality of spaced-apart conductive sections. A conductive layer of material is disposed on the detector plate on the side facing the active side of the emitter plate for developing an electric field to capacitively couple the layer and the track sections when a voltage signal is supplied to the layer. The conductive sections are thus caused to develop electric fields to be detected by the detector. A voltage supply source supplies the voltage signal to the conductive layer of the material on the detector plate.

BRIEF DESCRIPTION OF THE DRAWINGS

The above and other objects, features and advantages of the invention will become apparent from a consideration of the following detailed description presented in connection with the accompanying drawings in which.

DETAILED DESCRIPTION

Figure 1:
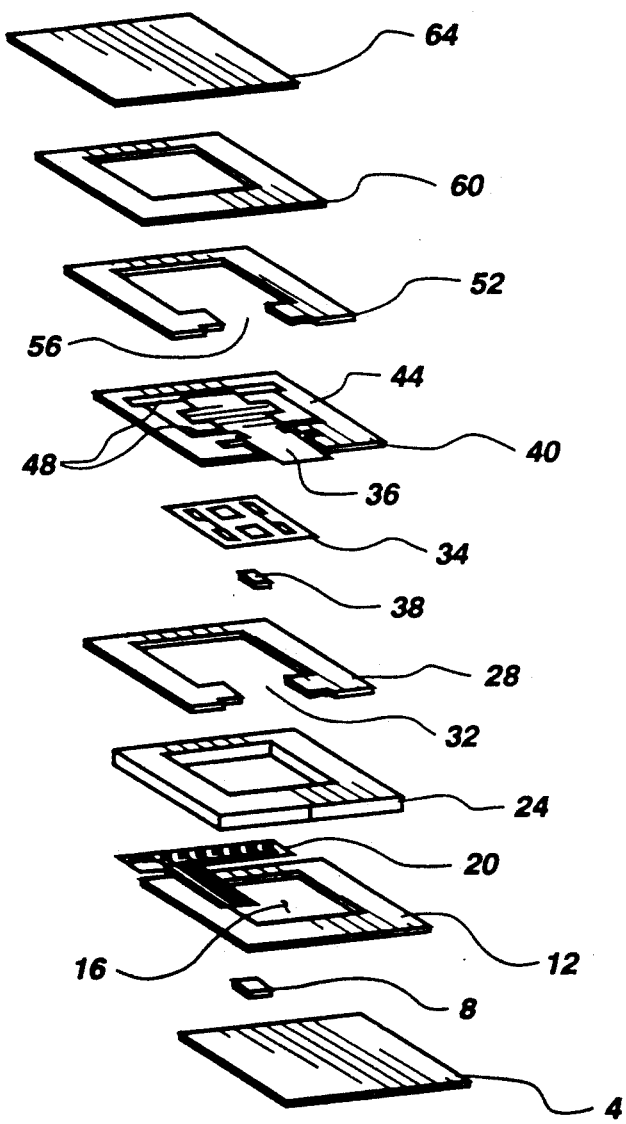
FIG. 1 is an exploded view of a linear displacement and strain measuring device made in accordance with the principles of the present invention.

Referring to FIG. 1, there is shown an exploded view of one specific illustrative embodiment of a linear displacement and strain measuring transducer made in accordance with the present invention for measuring strain in a specimen to which the transducer is attached. The transducer includes a base plate 4 which would be attached to a specimen in which strain was to be measured. A detector plate 8 is disposed on the base plate 4 in a fixed position. A spacer 12, formed with an opening 16, is disposed on the base plate 4 to circumscribe the detector 8, and a flex circuit board 20 is mounted on the base plate 4 within the opening 16 of the spacer 12. The flex circuit board 20 is made of a flexible material such as plastic and carries electrical conductors for connecting to the detector plate 8 to supply signals thereto and carry signals therefrom. Another spacer 24 is disposed on the spacer 12, and still a third spacer 28 is disposed on the spacer 24. An opening 32 is formed in one side of the spacer 28 to accommodate an elastomer seal for surrounding a tab 36 of an H-shaped support plate or structure 40, as will be discussed momentarily.

The H-structure 40 is a flexible plate which includes a frame 44 and the elongate tab 36 coupled to the frame by way of legs 48 to allow movement of the tab relative to the frame. Attached to the underside of the tab 36 is a normal force spring 34, and mounted on the normal force spring centrally thereof is an emitter plate or chip 38. When all the pieces thus described are joined together as indicated, the emitter 38 projects through central openings in the spacers 28 and 24 to lightly contact the detector plate 8. The thickness of the spacers 28 and 24 are selected to allow the emitter chip 38 to just contact the detector plate 8.

Mounted on the H-structure 40 is a spacer 52 having an opening 56 in one side thereof, again to accommodate the elastomer seal for the tab 36. Another spacer 60 is disposed on top of the spacer 52 and a cover plate 64 is disposed on the spacer 60 to cover the assembly package and prevent contamination of the parts thereof.

As already indicated the openings 32 and 56 of the spacers 28 and 52 respectively are formed to allow projection therethrough of the tab 36. A flexible elastomer seal (not shown) would fill the openings 32 and 56 to seal about the tab 36 to allow movement of the tab but also prevent entry into the package of contaminants, etc.

The base plate 4 and cover plate 64 might illustratively be made of metal such as beryllium copper, the spacers 12, 24, 28, 52 and 60 might also be made of a metal such as beryllium copper. The H-structure 40 is made of a resilient metal, as is the normal force spring 34. The parts would be joined together using conventional bonding techniques.

Figure 2:
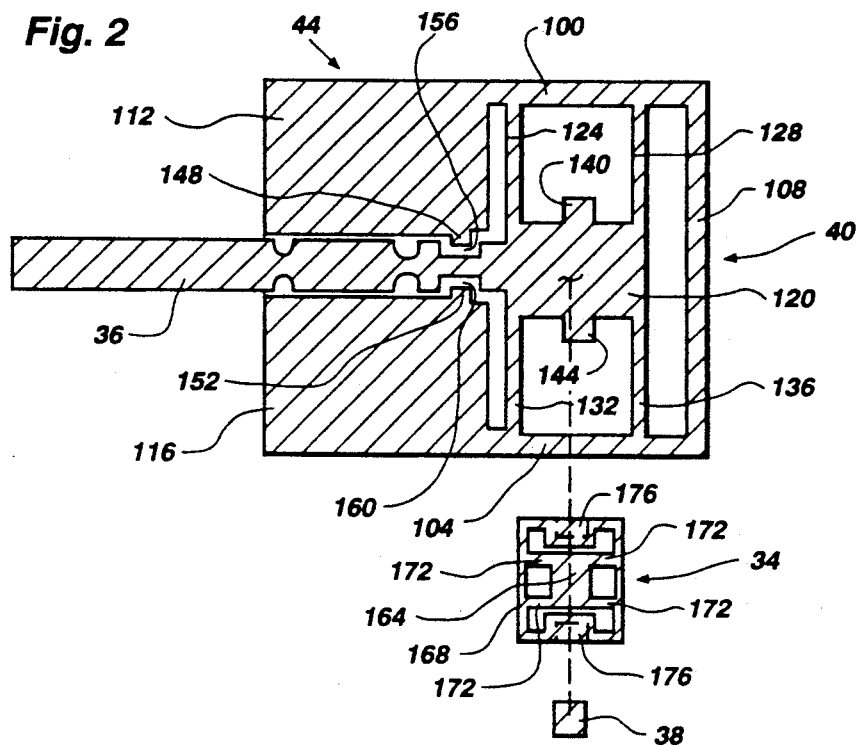
FIG. 2 is a top, plan view of the H-structure, normal force spring, and emitter of FIG. 1.

FIG. 2 shows a top, plan view of the H-structure 40 of FIG. 1 to include a plate frame 44 to which an elongate tab 36 is coupled. The tab 36 would be attached at its free end to a specimen in which the strain was to be measured, and, as already indicated, the base plate 4 (FIG. 1) would also be attached to the specimen so that strain occurring in the specimen at the location of attachment of the base plate and tab would cause movement of the tab relative to the base plate and thus relative to the frame 44.

The frame 44 includes a pair of side rails 100 and 104 joined at one of their ends by an end rail 108. The other ends of the side rails 100 and 104 are formed with large plate sections 112 and 116 respectively. The tab 36 extends between the plate sections 112 and 116 and terminates in an enlarged mounting section 120. The mounting section 120 is coupled at one side by a pair of legs 124 and 128 to the side rail 100, and at the other side by a pair of legs 132 and 136 to the side rail 104. The frame 44 is made of a resilient material such as beryllium copper to allow flexing of the legs 124, 128, 132 and 136 and thus movement of the elongate tab 36 linearly relative to the frame.

Extending laterally from either side of the enlarged mounting section 120 are tabs 140 and 144 on which a normal force spring plate 34 is mounted. The plate sections 112 and 116 also include tabs 148 and 152 which extend toward one another and into cutout sections 156 and 160 respectively of the elongated tab 36. The tabs 148 and 152 serve as stops to limit linear excursion of the tab 36 and prevent movement in either direction beyond a certain point. That is, the tabs 148 and 152 contact the edges of the cutout sections 156 and 160 to prevent further movement of the tab beyond certain limits.

The normal force spring plate 34 includes a central section 164 onto which the emitter chip 38 is mounted. The normal force spring plate 34 also includes a border region 168 which circumscribes the central section 164 and is joined thereto by a plurality of legs 172. The normal force spring plate 34 is made of a resilient material to bias or urge the central section 164, and thus the emitter chip 38, normally outwardly away from the enlarged mounting section 120 of the H-structure 40.

The normal force spring plate 34 is mounted onto the tabs 140 and 144 by means of mounting feet, shown by dotted line 176, which hold the normal force spring plate above the enlarged mounting section 120. The combination of the resiliency of the normal force spring plate 34 and the location of the mounting feet 176 serve to bias or urge the emitter 38 normally outwardly from the H-structure 40 and towards the detector 8 (FIG. 1)

as described earlier. A wear-resistant film, such as silicon nitride, is provided on the emitter 38 and/or detector 8 to prevent friction and wear between the two. Alternatively to disposing the emitter 38 and detector 8 in light rubbing contact, the emitter could be held by a mechanical support just out of contact with the detector.

Figure 3:
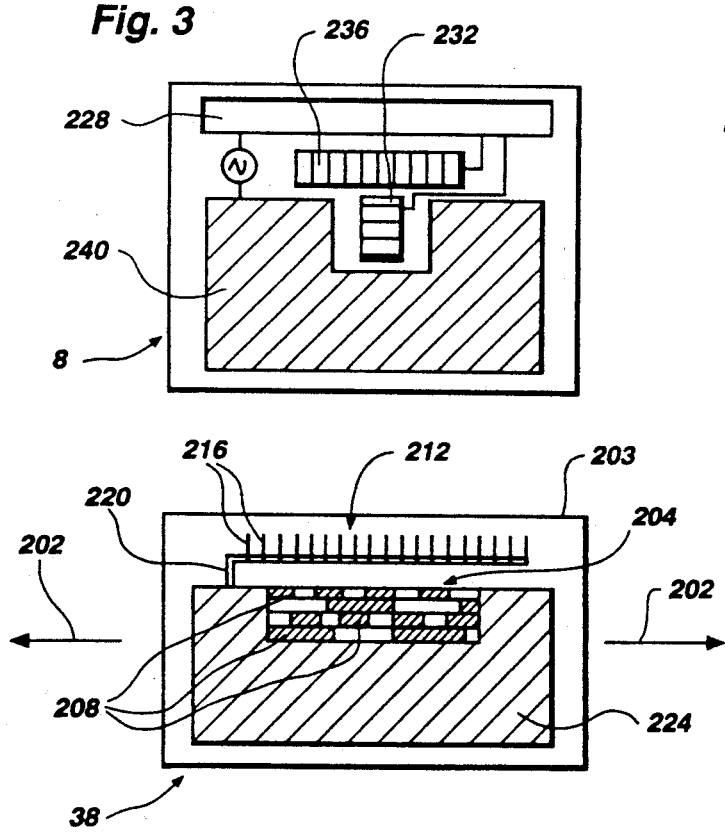
FIG. 3 are top, plan views of the detector and emitter of the device of FIG. 1.

FIG. 3 shows top, plan, diagrammatic views of the detector plate 8 and the emitter chip 38 of FIG. 1. The parts of the emitter chip 38 would be positioned on the bottom side of the chip and then the chip would be disposed over the detector chip 8 as earlier described.

The emitter chip 38 is disposed to move linearly in the direction indicated by arrows 202. The chip 38 comprises a sapphire plate 203 on which are formed a plurality of linear tracks 204 positioned side-by-side to extend generally parallel with the direction of movement of the chip. Each of the tracks 204 is formed with alternating conductive and nonconductive segments, the conductive segments 208 being shown as shaded and the nonconductive segments being shown as unshaded. (The track representations 204 are drawn simple to illustrate the idea of segmentation and should not be taken to represent an actual pattern such as that shown in FIG. 7.) The conductive segments 208 are electrically coupled together and to a conductive sheet 224 which overlays a large portion of the plate 203. The conductive segments 208 and conductive layer 224 could be made, for example, of a layer or film of aluminum. As will be discussed, the conductive segments 208 may be energized to produce an electric field pattern which varies linearly over the tracks 204. Because the conductive segments 208 are all electrically connected together, the conductive pattern is electrically continuous with no isolated regions to enable electrifying the pattern by capacitive coupling as will also be described later.

Advantageously, the conductive pattern of sections on the emitter chip 38 is formed to present a Gray code such that movement of the emitter chip past a transverse locus of points (at which electric field sensors will be located) results in incremental changes in the value of the code. Of course, if the value changes incrementally as the emitter chip is moved, then this value may be detected to provide an indication of the linear displacement of the emitter relative to the detector, and thus an indication of strain.

Figure 4:
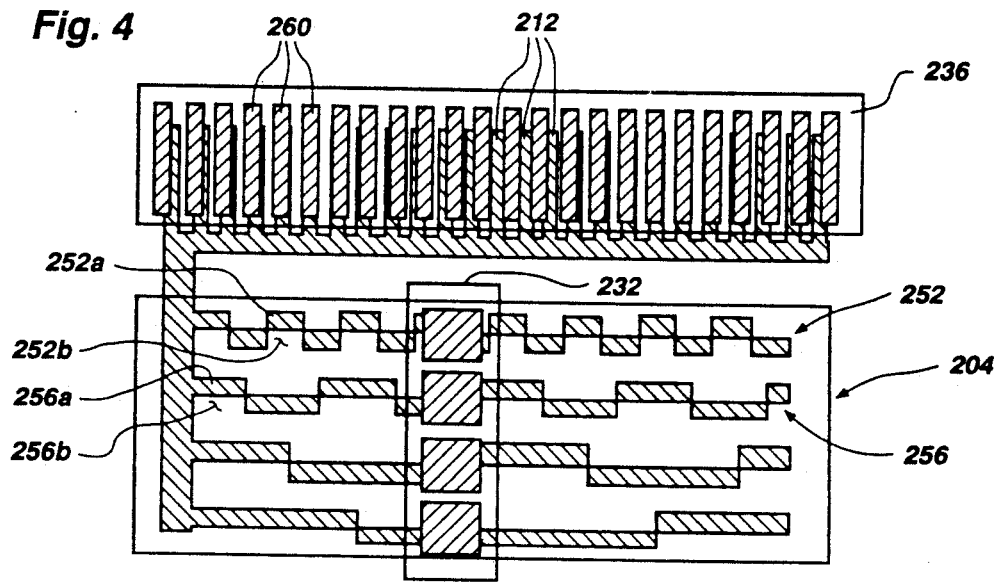
FIG. 4 is a top, plan, graphic representation of one embodiment of the emitter of the present invention, shown to include Gray code tracks and a Vernier array.
Figure 7:
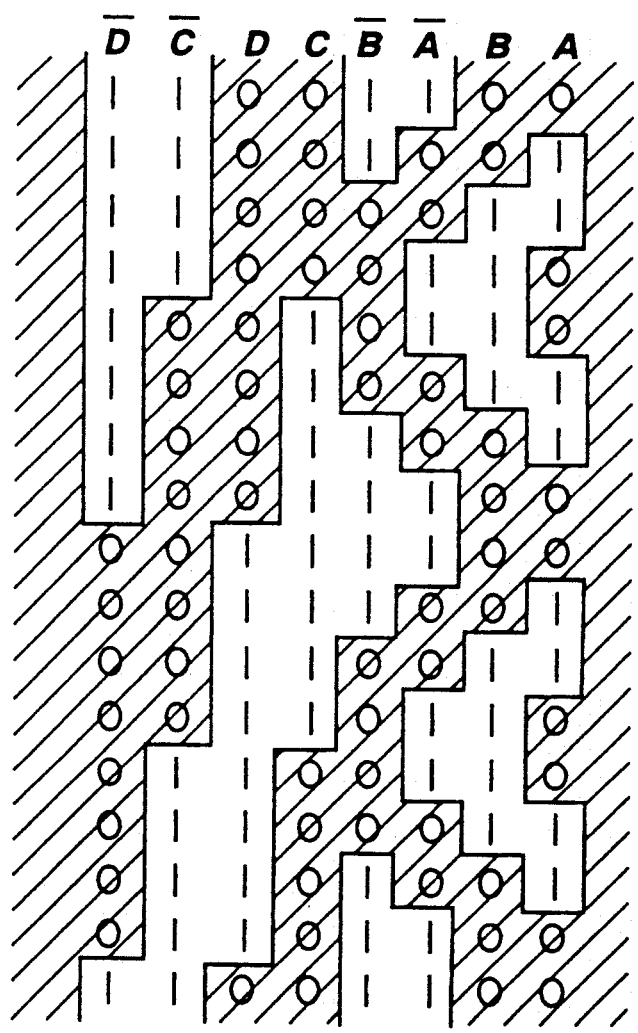
FIG. 7 is a schematic and diagrammatic representation of linear complementary tracks presenting a Gray code configuration.

A graphic representation of the tracks 204 is shown in FIG. 4. The tracks are formed as complementary or conjugate pairs 252, 256, etc., as indicated, except that each track of a pair is spaced at least one track apart from the other track of the pair, as shown in FIG. 7. The tracks of each pair are shown positioned side-by-side in FIG. 4 simply for ease of explanation. The complementary or conjugate aspect of each pair of tracks is illustrated by reference to segments 252a and 252b of the pair of tracks 252. Segment 252a is shown as shaded in FIG. 4 indicating that it is metallized or is formed of a conductive layer of material, whereas the light or unshaded segment 252b indicates that the segment is nonconductive. Segments 252a and 252b occupy the same transverse position on the emitter plate, but, of course, in separate, spaced-apart tracks. Similarly, segments 256a and 256b (being larger than segments 252a and 252b) are conjugate in that section 256a is metallized and 256b is unmetallized. As already mentioned, the metallized segments are capable of producing an electric field whereas the unmetallized segments are not, and in this manner an electric field is developed on the emitter chip which varies linearly in the direction of movement of the chip.

Referring back to FIG. 3, there is shown an array 212 of conductive fingers 216 positioned side-by-side transversely of the array axis. The conductive fingers 216 are all coupled by a conductor 220 to the conductive sheet 224 so that energizing the conductive sheet will result in energizing the conductive fingers to produce electric fields just as do the metallized segments 208.

The conductive finger array 212 is formed into a Vernier array to provide a means of determining position and movement of the emitter chip 38 between increments or transitions from one value to the next of the Gray code tracks 204. That is, transitions from one value to another value along the Gray code tracks 204 occur over a certain interval or distance of movement, and the Vernier array 212 is provided to determine positions and movement within such interval. Vernier measurement of linear displacement was described in U.S. Pat. No. 4,964,306, which is incorporated herein by reference, and the same techniques are utilized here. The Gray code tracks 204 thus provide a large dynamic range for the transducer of the present invention, and the Vernier array 212 provides desired high resolution.

The detector plate 8, shown in FIG. 3 and made for example of silicon, includes an array of electric field sensors 232 positioned to extend transversely of the segmented tracks 204 when the emitter chip 38 is disposed over the detector plate 8. As will be described in detail later, each sensor in the array 232 is disposed opposite a respective one of the segmented tracks. Also formed on the detector plate 8 is a second array of electric field sensors 236 positioned to lie opposite the conductive finger array 212 when the emitter plate 38 and detector plate 8 are assembled as indicated in FIG. 1. The sensors of the array 236 are best shown in FIG. 4 as transverse detector elements 260 which are uniformly spaced just slightly farther apart than are the uniformly spaced underlying conductive fingers 212. That is, over a given distance of the sensor array 236 and conductive finger array 212 there will be one more conductive fingers than sensors and this configuration defines the Vernier measuring scales of the transducer.

FIG. 7 shows an exemplary arrangement complimentary tracks laid out in an linear array and formed to present a Gray code. The tracks are shown to the right, with the metalized portions being shaded to represent "0's", and a nonmetalized portion representing "1's". The corresponding code value for each incremental advance along the tracks is shown to the left, and, as can be seen, the code value increases by one bit while advancing incrementally from the top to the bottom of the tracks. As can also be seen, all metalized portions of the track are electrically continuous and can be readily fabricated using etching and photolitographic techniques.

Referring again to FIG. 3, there is shown a conductive sheet 240 disposed to cover about two-thirds of the detector plate 8 to partially surround the sensor array 232. An integrated circuit 228 is also formed on the detector plate 8 to provide the processing logic for calculating linear displacement or strain detected by the sensor arrays 232 and 236 of the emitter plate 38. The integrated circuit 228 also provides energizing signals to the conductive sheet 240 in the form of square wave signals. The conductive sheet 240, in turn, develops electric fields which capacitively couple the conductive sheet 240 with the conductive sheet 224 of the emitter chip 38; the conductive segments 208 and conductive fingers 212 are thereby energized to produce the desired electric field patterns.

Figure 3A:
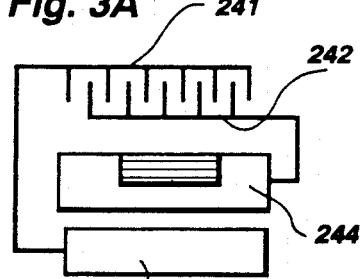
FIG. 3A is a top, plan view of another embodiment of an emitter for use in the present invention.

FIG. 3A shows a top, plan view of an alternative embodiment of the emitter of the present invention. In this embodiment, two sets 241 and 242 of interdigitated conductive fingers are provided, each set being electrically coupled to a respective conductive sheets 243 and 244. Two separate conductive sheets on the corresponding detector plate would capacitively couple the conductive sheets 243 and 244 to drive or energize the conductive finger arrays 241 and 242 180 degrees out of phase to provide a bipolar emitter array. The advantage of the bipolar emitter array is that better contrast in the electric field emitted by the interdigitated fingers is achieved and this enhances the resolution of the transducer.

Figure 5:
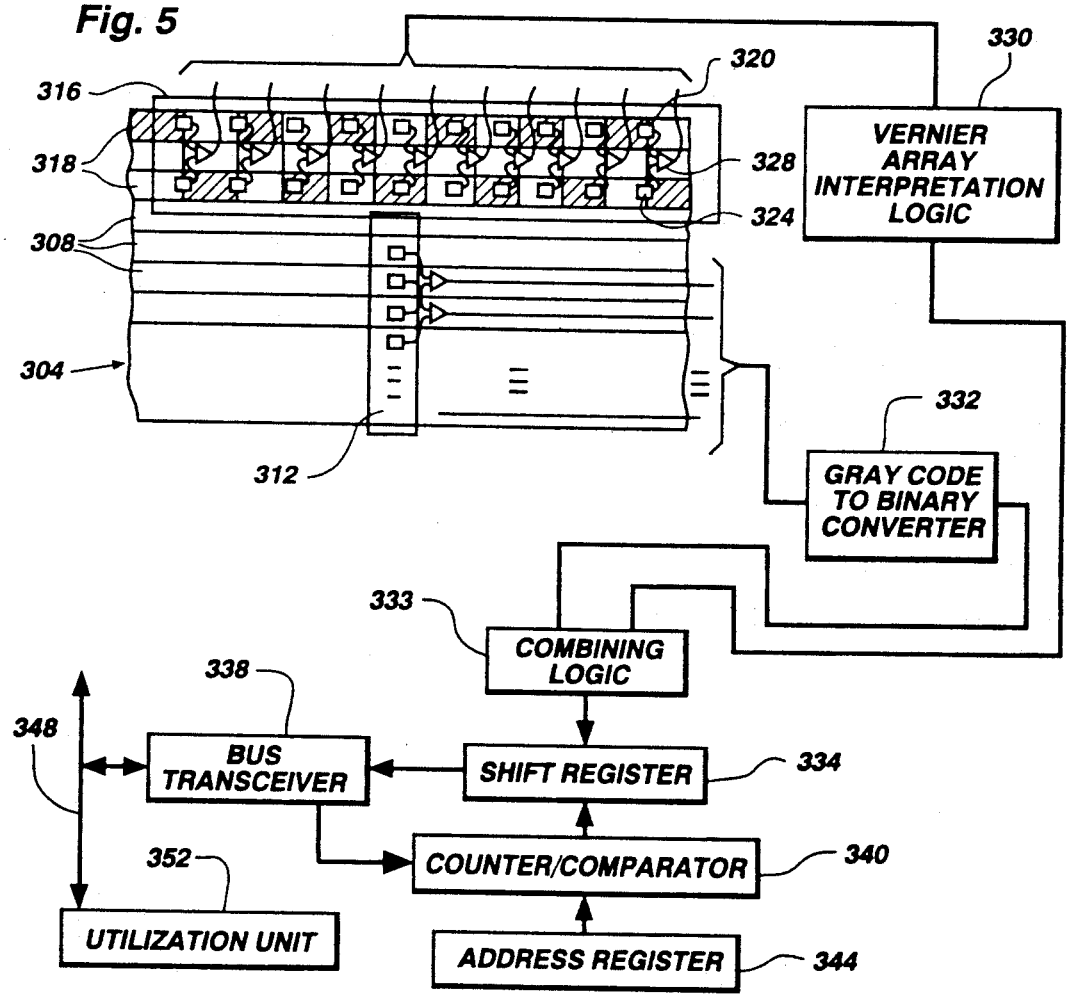
FIG. 5 is a top, schematic view showing sensing elements positioned relative to linear tracks of one emitter embodiment of the present invention.

Referring to FIG. 5, there is shown a schematic view of a portion of an emitter chip 304 showing a plurality of segmented tracks 308. Shown disposed over the tracks in two arrays are a transverse array of sensors 312 (Gray code array) and a colinear array of sensors 316 (Vernier array).

These sensor arrays would be located on the detector plate (not shown in FIG. 5.) The Vernier array 316, rather than being made up of conductive fingers as discussed for FIGS. 3, 3A and 4, alternatively is composed of a pair of complimentary, segmented tracks 318.

Each sensor in the arrays includes two electric field sensing elements, such as elements 320 and 324, each disposed over a respective track of a complimentary pair for intercepting electric fields emanating from the tracks. Each sensor in the arrays also includes a regenerative differential amplifier, such as amplifier 328, coupled to the sensing elements (such as sensing elements 320 and 324). With this configuration, the sensing elements 320 and 324 will sense opposite conditions since the two tracks over which they are positioned are conjugate. That is, when one sensing element senses an electric field from an electrified section, the other sensing element will be sensing the absence of an electric field from a non-electrified section, and vice versa. Thus, opposite signals (for example, a high and a low signal) will be supplied by the sensing elements 320 and 324 to the regenerative differential amplifier 328. The differential amplifier 328, in turn, produces an output signal representing the difference between values of the input signals. The regenerative differential amplifier contains circuitry such that when it is strobed, it will give a first signal if the amount of coupled field on the first of its two sensor plates is greater than that on its second plate, and it gives a second signal if the second plate has received the greater coupled electric field. The use of conjugate tracks and regenerative differential amplifiers to sense the electric field's reliability in sensing transitions between electric fields and no electric fields over what would be achievable if single tracks were used.

For the Vernier array 316, advantageously the number of sensors is one less than the number of segment transitions (or conductive fingers, if fingers are used) over the portion of the tracks 318 covered by the Vernier array. With this configuration, very small linear displacements of the emitter chip 304 will cause successive ones of the sensors in the Vernier array 316 to detect transitions to thereby provide readings or measurements of small incremental displacements. In effect, the Vernier array 316 provides fine readings of linear displacement between successive increments or changes in Gray code value, as detected by the transverse array of sensors 312.

The sensors, including the sensing elements and differential amplifiers, are fabricated on the detector plate utilizing VLSI manufacturing techniques. The outputs of the sensors are supplied to interpretation and computational logic which is also fabricated on the detector plate (identified as integrated circuit 228 in FIG. 3) using VLSI techniques. Such logic includes Vernier array interpretation logic 330 which receives the output from the sensors in the Vernier array of sensors 316 and converts the Vernier scale readout, represented by the sensor output, into a binary coded value. This can be done by table look-up, conventional combinatorial logic, or statistical sampling. This binary value is supplied by the logic 330 to a combining logic circuit 333. Circuit 333 combines information from the Vernier and Gray code arrays into a final output digital value indicating displacement.

The outputs from the sensors in the Gray code sensor array 312 are supplied to a Gray code to binary converter 332 which converts the sensor outputs to a binary representation of the value of the Gray code encountered by the Gray code sensor array. This binary information is supplied to the combining logic circuit 333 which combines the information with the binary information received from the logic 330 and supplies it to a shift register 334.

The binary information stored in the shift register 334, with information in the logic 330 representing least significant bit positions and information from the converter 332 representing more significant bit positions, provides an indication of linear position or displacement of the emitter chip 304 and thus an indication of strain occurring in the specimen on which the transducer is mounted.

In this manner, more coarse positions or diplacements of the emitter chip 304 are determined by detection of Gray code changes with movement of the chip, whereas the Vernier array of sensors 316 provides for more fine position or displacement determination of the emitter chip (between each increment in value of the Gray code).

The information stored in the shift register 334 may be selectively shifted from the register to a bus transceiver 338 in response to a shift signal received from a counter/comparator circuit 340. The counter/comparator circuit 340 counts clock pulses supplied by the bus transceiver 338 and when the count reaches a value corresponding to an address stored in an address register 344, the shift signal is supplied to the shift register 334. The address stored in the address register 344 identifies the particular transducer of which the circuitry of FIG. 5 is a part. Use of the address register 344 in this manner allows for multiplexing the outputs of many transducers onto a single output bus such as bus 348 shown in FIG. 5. In effect, the clock pulses supplied by the bus transceiver 338 to the counter/comparator 340 would also be supplied in parallel to other counter/comparators of other transducers, and when a particular addresses identifying the respective transducers were reached by the corresponding counter/comparators, the displacement or strain measurement residing in the corresponding shift registers would be supplied to the bus 348 for ultimate supply to a utilization unit 352. In this manner, strain measurements are multiplexed onto the bus 348 and supplied to the utilization unit 352 which may display the information, process it for use in adjusting the specimen in which the strain is occurring, etc. The bus 348 and utilization unit 352 would be in common with all of the transducers while each transducer includes its own bus transceiver, shift register, counter/comparator, address register, etc. All such logic and circuitry may be fabricated on the detector plate 8 at the integrated circuit section 228 shown in FIG. 3, using VLSI techniques.

Figure 8:
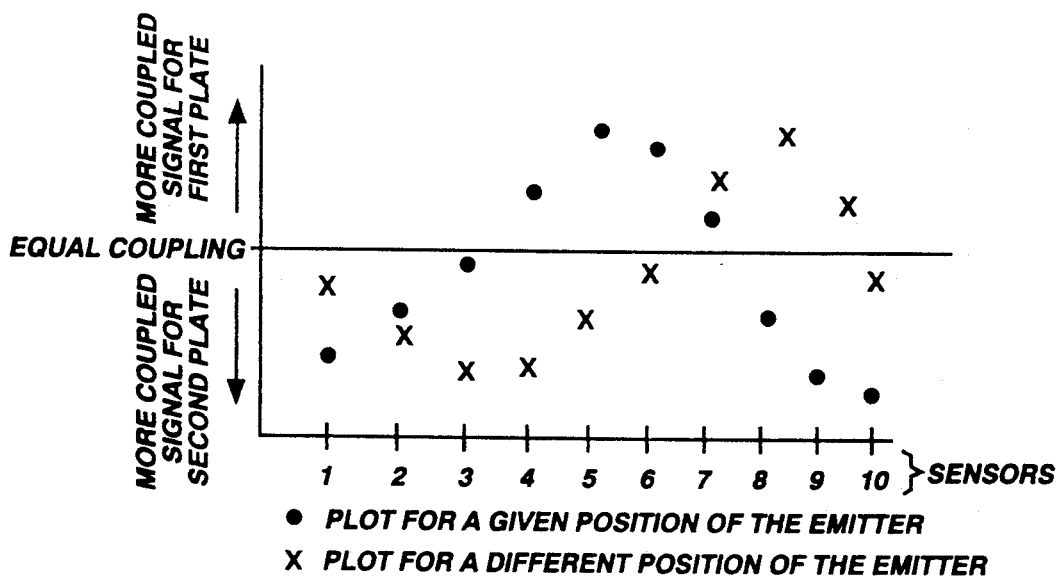
FIG. 8 is a graph plotting of representative outputs of Vernier array sensors of the present invention.

Alternately to including the logic and circuitry shown in FIG. 5, a microprocessor could be provided for processing sensor outputs to make the calculations for determining linear displacements or strain. This can be done in a number of ways including use of an algorithm that determines the phase of a waveform developed by plotting the outputs of each of the sensors in the Vernier array as shown in FIG. 8. The phase of this periodic waveform, with respect to the first sensor in the array, is an indication of the displacement between emitter and detector. In the case of the sensor being a strobed regenerative differential amplifier with only two possible output states, the data point for each sensor must be produced by strobing the sensor many times and using the ratio of the number of first output states received per number of times strobed, as an indication of the difference in field strength received at the two sensor plates of the amplifier. The phase of the waveform, as determined by the algorithm, is then converted to a binary value.

Figure 6:
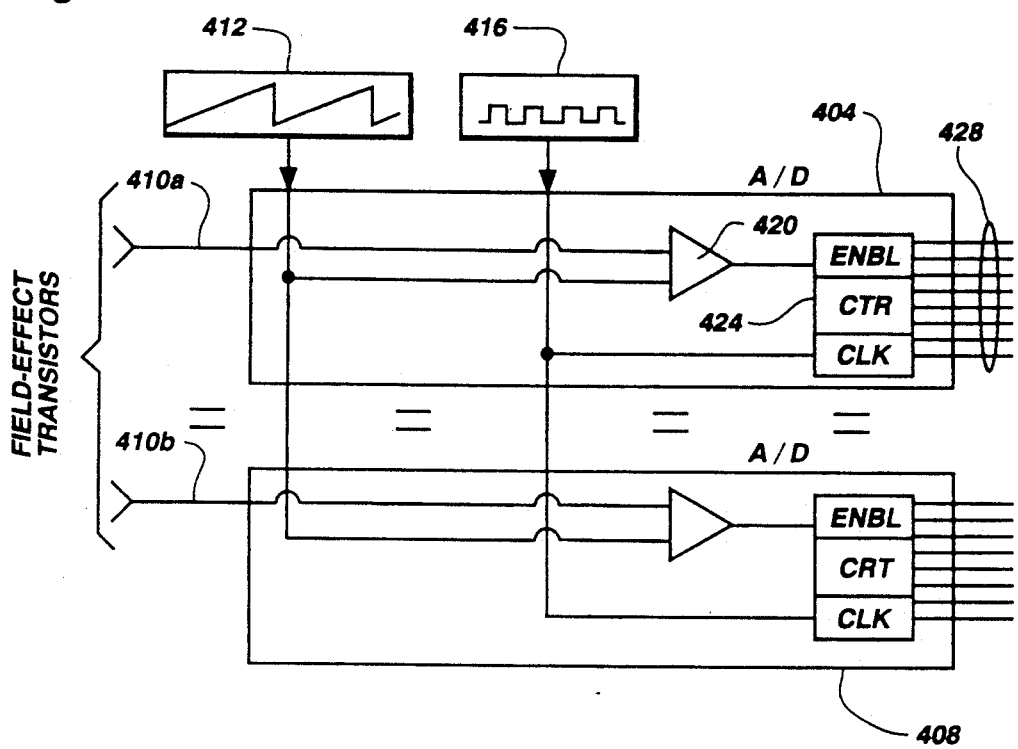
FIG. 6 is a schematic of one embodiment of an analog-to-digital converter suitable for use in the present invention.

In place of sensors utilizing sensing elements and differential amplifiers, field-effect transistors could be provided for detecting variation in electric field strength emanating from the conductive fingers of the Vernier arrays. The field effect transistors would provide output signals whose values were proportional to the strength of the electric field detected, in a well-known manner. Such outputs could be converted from the analog form to a digital form by the analog to digital converter shown in FIG. 6. Here, two analog to digital converters 404 and 408 are shown. Each analog to digital converter receives an output from a different field effect transistor over lines 410a, 410b, etc. Each analog to digital converter also receives a ramp voltage signal from a ramp voltage signal generator 412 and a clock pulse from a clock pulse generator 416. The ramp voltage is supplied to a comparator 420 which, when the ramp voltage level reaches the level of the signal received from the corresponding field effect transistor, signals a counter 424. The clock pulses from the clock pulse generator 416 are supplied to the counter 424 which counts the pulses until a signal is received from the comparator 420, at which time the counter supplies the then existing count to output leads 428 for transfer to interpretation and computational logic circuitry such as described in FIG. 5. In this manner, the level of the output signal from each field effect transistor sensor is converted to the digital value for processing. The counter 424, comparator 420, ramp voltage generator 412 and clock pulse generator 416 are all conventional devices.

It is to be understood that the above-described arrangements are only illustrative of the application of the principles of the present invention. Numerous modifications and alternative arrangements may be devised by those skilled in the art without departing from the spirit and scope of the and the appended claims are intended to cover such modifications and arrangements.

What is claimed is:

1. Linear displacement measuring apparatus comprising
   a linearly moveable element whose linear displacement is to be measured,
   emitter means disposed on the moveable element to move as the element is moved, for developing predetermined patterns of electric fields which vary linearly on the emitter means in the direction of movement of the element, and
   detector means disposed in close proximity to the emitter means adjacent the path in which the emitter means moves to detect variation in the electric field patterns as the emitter means is moved, for producing output signals representing variations in the electric field patterns and thus the linear displacement of the moveable element.

2. Apparatus as in claim 1 wherein said emitter means comprises a generally planar emitter plate mounted on the linearly moveable element to move in the plane defined by the emitter plate and to direct the electric fields normally from an active side of the plate, and wherein said detector means comprises a generally planar detector plate disposed in a fixed position, generally parallel with the emitter plate on the active side thereof to thereby detect variation in the electric field patterns as the emitter plate is moved.

3. Apparatus as in claim 2 wherein said moveable element comprises an elongate tab means, and wherein said emitter plate is mounted on the tab means and includes a plurality of emitter element sections formed in predetermined patterns on the active side of the plate to develop electric fields in response to electric input signals, said apparatus further comprising means for supplying electric input signals to the emitter element sections.

4. Apparatus as in claim 3 wherein said emitter means further comprises biasing means disposed between the tab means and the emitter plate for biasing the plate into light rubbing contact with the detector plate, and wherein the detector plate includes a wear-resistant film disposed over the detector plate for light rubbing contact with the emitter plate.

5. Apparatus as in claim 4 wherein said biasing means comprises
   a spring plate resilient in a direction normal to the plane of spring plate, and having a central section to which the emitter plate is attached, an outer frame section, and a plurality of legs connecting the central section to the frame section, and
   mounting feet disposed between the frame section of the spring plate and the tab means for holding the spring plate above the tab means.

6. Apparatus as in claim 3 wherein said electric input signal supplying means comprises
   a conductive layer of material disposed on the detector plate on the side facing the active side of the emitter plate, for developing an electric field to capacitively couple the layer and the emitter element sections when a voltage signal is supplied to the layer, said emitter element sections thereby developing electrical fields, and
   voltage supply means for supplying a voltage signal to the conductive layer of material.

7. Apparatus as in claim 6 wherein said emitter element sections are electrically coupled together.

8. Apparatus as in claim 7 wherein said emitter element sections are formed into a plurality of linear, sideby-side, selectively segmented tracks, positioned to present successively changing patterns linearly along the emitter plate in the direction of the tracks.

9. Apparatus as in claim 8 wherein said detector means comprises a first plurality of electric field sensors disposed in an array on the detector plate, generally transversely of the tracks, for detecting variations in the electric field patterns as the emitter plate moves.

10. Apparatus as in claim 9 wherein said segmented tracks are formed to present a digital Gray code such that upon movement of the emitter plate in increments of a predetermined amount, the sensors detect at least a one-bit change in the code.

11. Apparatus as in claim 10 wherein the track segments presenting the Gray code are formed into a plurality of pairs of complementary tracks, each track of a pair being spaced laterally at least one track apart, and wherein said sensors comprise a plurality of pairs of sensors, each pair being positioned adjacent a respective pair of complementary tracks to detect electric fields emanating from the tracks.

12. Apparatus as in claim 11 wherein each pair of sensors comprises a pair of electrical conductors positioned adjacent a respective pair of complementary tracks to intercept electric fields which may be encountered by the conductors as the emitter plate is moved, and a differential amplifier means coupled to the electrical conductors for producing an output signal representing the difference between electric fields intercepted by the electrical conductors.

13. Apparatus as in claim 11 wherein said sensors comprise a field-effect transistor for producing output signals indicative of the strength of the electric fields detected by the transistors as the respective tracks move therepast.

14. Apparatus as in claim 10 wherein said emitter plate further includes a plurality of uniformly spaced-apart conductive fingers positioned side-by-side in an array generally parallel with the tracks, and electrically coupled to the emitter element sections to produce electric fields when the emitter element sections produce electric fields, and wherein said detector means further comprises a second plurality of electric field sensors disposed in an array on the detector plate opposite the array of conductive fingers on the emitter plate for detecting variation in electric field strength emanating from the fingers as the emitter plate moves relative to the sensors, said sensors of the second plurality being spaced apart uniformly such that for a certain range of movement of the emitter plate, each sensor at some point over the range will be the only sensor positioned directly opposite a conductive finger in a Vernier configuration.

15. Apparatus as in claim 14 further including means for energizing every other conductive finger in the array by an electrical signal of one polarity and means for energizing the remaining conductive fingers in the array by an electrical signal of a different polarity.

16. Apparatus as in claim 14 wherein the spacing of sensors in the second plurality differs from the spacing of the conductive fingers.

17. Apparatus as in claim 14 wherein said sensors each comprises
a pair of electrical conductors spaced apart in the direction of the sensor array, and a sensing amplifier coupled to the pair of electrical conductors for responding to a strobe signal by producing a first signal when one of the conductors of the pair is closer to a conductive finger than the other, and a second signal when the other conductor is closer to a conductive finger than said one conductor,
said detector means further including means for selectively supplying strobe signals to said sensing amplifiers, and means for receiving the first and second signals from the sensing amplifiers and for determining the number of first signals received from each sensing amplifier for a given number of strobe signals supplied to the sensing amplifiers.

18. Apparatus as in claim 17 wherein the pairs of conductors and conductive fingers are positioned relative to one another to define a Vernier scale.

19. Apparatus as in claim 18 wherein said detector means further includes
means for developing from said coupled first and second signals, a periodic data plot curve representing the number of first signals produced by each sensing amplifier for a predetermined number of strobe signals, and having a period corresponding to the difference in spacing between the conductive fingers and the pairs of electrical conductors, and
means for determining the phase of the periodic curve relative to the first sensing amplifier in the array to thereby determine the displacement of the emitter plate relative to the detector plate.

20. Apparatus as in claim 19 wherein said phase determining means comprises processing means for calculating zero crossings of the curve to reveal the phase.

21. Apparatus as in claim 19 wherein said phase determining means comprises processing means for least square fitting of a predetermined mathematical function to at least a portion of the curve to thereby reveal the phase.

22. Apparatus as in claim 19 wherein said phase determining means comprises processing means for offsetting the curve an amount sufficient to produce a modified curve with zero mean value, integrating a section of the modified curve, determining the location along the modified curve at which the integration is nearest zero and the modified curve is in a positive transition, to thereby reveal the phase.

23. Apparatus as in claim 14 wherein said sensors comprise field-effect transistors for producing analog signals whose magnitudes represent the strength of the electric fields to which the transistors are exposed.

24. Apparatus as in claim 23 wherein said detector means further includes analog-to-digital conversion means for converting the analog signals produced by the field-effect transistors into digital signals.

25. Apparatus as in claim 24 wherein said analog-to-digital conversion means comprises
a ramp signal generator for producing a succession of ramp signals,
clock means for producing a series of clock pulses,
a plurality of comparator means, each coupled to a different field-effect transistor and to the ramp signal generator for comparing the analog signal from a corresponding field-effect transistor with a ramp signal and for producing an output signal when the compared signals match,
a plurality of counters, each coupled to a different comparator means and to the clock means for producing a digital count representing the number of clock pulses received between receipt of output signals from the corresponding comparator means.

26. Apparatus as in claim 14 further including means coupled to the first plurality of sensors for developing first binary data representing Gray code values detected by the first plurality of sensors, means coupled to the second plurality of sensors for producing second binary data representing Vernier measurements detected by the second plurality of sensors, and means for combining the first and second binary data in a binary word representing linear displacement of the emitter plate relative to the detector plate.

27. Apparatus as in claim 26 further including a data bus coupled to a utilization unit, a shift register for temporarily storing the binary words, an address register for storing an address number identifying the apparatus, counter/comparator means coupled to the address register for receiving and counting clock pulses and signaling the shift register to shift its contents to the data bus when the clock pulse count equals the value of the address number, and means for supplying clock pulses to the counter/comparator means.

28. A uniaxial strain transducer comprising a frame attachable to an object in which strain is to be measured, an elongate element joined at one end to the frame and moveable in a linear direction relative thereto, said element being attachable at the other end thereof to the object, emitter means disposed on the elongate element to move as the element is moved, and including at least one linear track extending in the direction of movement of the emitter means for developing predetermined patterns of electric fields which vary along the length of the track, detector means disposed on the frame in close proximity to the emitter means adjacent the path of movement of the track for detecting variations in the electric field patterns as the track moves relative to the detector means and for producing output signals representing such variations and thus the amount of movement of the emitter means relative to the detector means.

29. A transducer as in claim 28 wherein said frame comprises a flex structure including first and second spaced-apart, generally parallel side rails and an end rail joining selected ends of the side rails and being generally perpendicular therewith, and a first pair of laterally flexible legs extending generally parallel to one another to join the first side rail to one side of the elongate element at said one end thereof, and a second pair of laterally flexible legs extending generally parallel to one another to join the second side rail to the other side of the elongate element at said one end thereof, said legs thereby allowing uniaxial movement of the elongate element relative to the side rails.

30. A transducer as in claim 29 further including a wear-resistant film disposed between the detector means and emitter means, and a resilient biasing means disposed between the emitter means and the elongate element to urge the emitter means away from the elongate element into light rubbing contact with the film on the detector means.

31. A transducer as in claim 30 wherein said biasing means comprises a spring plate resilient in a direction normal to the plane of the plate, and having a central section on which the emitter means is disposed, an outer support section, and a plurality of resilient legs connecting the central section to the support section to urge the central section away from the elongate element, and mounting pads disposed between the support section of the spring plate and the elongate element to hold the spring plate a distance above the elongate element.

32. A transducer as in claim 31 wherein said frame further comprises a base plate on which said detector means is disposed, said base plate being attachable to the object, a first spacer disposed on the base plate to circumscribe the emitter means, said flex structure onto the first spacer so that the emitter means is disposed in light contact with the detector means, a second spacer disposed on the side rails and end rail of the flex structure, and a cover plate disposed over the second spacer.

33. A transducer as in claim 30 wherein said emitter means includes a plurality of parallel, linear tracks extending in the direction of movement of the emitter means, each of said tracks being segmented to define a plurality of spaced-apart conductive sections for producing electric fields when energized, wherein said detector means includes a plurality of sensors, each positioned adjacent a respective track to detect electric fields of the respective track as the emitter means is moved relative to the sensors, and produce electrical output signals representing the electric fields detected, said transducer further including means for energizing said conductive sections, and means for producing utilization information from the electrical output signals, indicating the amount of movement of the emitter means relative to the detector means.

34. A transducer as in claim 33 wherein the sections of said tracks are formed to define a Gray code whose value changes incrementally relative to movement of the tracks past a fixed transverse locus on the detector means, and wherein said sensors are positioned in an array coincident with said transverse locus.

35. A transducer as in claim 34 wherein said detector means further includes a second plurality of sensors disposed linearly adjacent a selected track and positioned relative to the sections of the selected track to produce vernier measurements of the movement of the selected track relative to the second plurality of sensors.

36. A transducer as in claim 35 wherein the tracks are formed as a plurality of pairs of complementary tracks in which the sections of one track of a pair are conjugate, at any given transverse position, to the sections of the other track of a pair, and wherein each sensor comprises a pair of detector elements disposed adjacent respective tracks of a pair for detecting the electric fields produced by the sections of the respective tracks, and a regenerative differential amplifier coupled to the pair of detector elements for producing a sensor signal representing the difference between electric fields detected by the detector elements.

37. A transducer as in claim 36 wherein the complementary tracks of each pair are positioned laterally at least one track apart.

38. A transducer as in claim 33 wherein said energizing means comprises a conductive plate disposed on the detector means for producing an electric field in response to a voltage signal to thereby energize the conductive sections of the emitter means and cause them to produce electric fields, and means for supplying a voltage signal to the conductive plate, and wherein said conductive sections are electrically coupled together.

39. A transducer as in claim 34 wherein said energizing means comprises a conductive plate disposed on the detector means for producing an electric field in response to a voltage signal to thereby energize the conductive sections of the emitter means and cause them to produce electric fields, and means for supplying a voltage signal to the conductive plate, and wherein said conductive sections are electrically coupled together.

40. A transducer as in claim 39 wherein said emitter means further includes a second conductive plate electrically coupled to said conductive sections of the tracks for intercepting at least a portion of the electric field produced by the conductive plate of the detector means.

* * * * *